United States Patent
Martin et al.

(10) Patent No.: US 11,222,478 B1
(45) Date of Patent: Jan. 11, 2022

(54) SYSTEM AND METHOD FOR AUTOMATED TRANSFORMATION OF MULTIMEDIA CONTENT INTO A UNITARY AUGMENTED REALITY MODULE

(71) Applicant: Design interactive, Inc., Orlando, FL (US)

(72) Inventors: Eric Martin, Sanford, FL (US); Sam Haddad, Oviedo, FL (US); Matt Johnston, Gainesville, FL (US); Matt Archer, Oviedo, FL (US)

(73) Assignee: DESIGN INTERACTIVE, INC., Orlando, FL (US)

( * ) Notice: Subject to any disclaimer, the term of this patent is extended or adjusted under 35 U.S.C. 154(b) by 0 days.

(21) Appl. No.: 17/115,274

(22) Filed: Dec. 8, 2020

Related U.S. Application Data (60) Provisional application No. 63/007,992, filed on Apr. 10, 2020.

(51) Int. Cl.
*G06T 19/00* (2011.01)
*G06T 1/20* (2006.01)

(52) U.S. Cl.
CPC .............. *G06T 19/006* (2013.01); *G06T 1/20* (2013.01); *G06T 2215/16* (2013.01)

(58) Field of Classification Search
None
See application file for complete search history.

(56) References Cited

U.S. PATENT DOCUMENTS 9,047,698 B2 * 6/2015 Maciocci ................ G06F 3/167
9,224,246 B2 12/2015 Lee et al.
(Continued)

FOREIGN PATENT DOCUMENTS

| KR | 100573983 | 4/2006 |
|---|---|---|
| KR | 20110119146 | 11/2011 |
| KR | 20130140339 | 12/2013 |
| KR | 101447992 | 10/2014 |
| KR | 101791917 | 11/2017 |
| WO | 2018233533 | 12/2018 |

OTHER PUBLICATIONS

OGC@ Augmented Reality Markup Language 2.0 (ARML 2.0). 2015. https://www.ogc.org/standards/arml.
(Continued)

*Primary Examiner* — Jason A Pringle-Parker
(74) *Attorney, Agent, or Firm* — Terry M. Sanks, Esq.; Beusse Sanks, PLLC (57) ABSTRACT

A computer implemented method is disclosed including producing, with at least one of a computing device, an augmented reality computing device, a virtual reality computing device and a mixed reality computing device, multiple sources of data files provided in individual formats to overlay within a real-world environment, combining the multiple sources of data files into a unified data format that provides for each individual data format of the multiple sources of data files to run independently and with at least one of a spatial anchor and a temporal anchor to provide for a three-dimensional ("3D") arrangement of the plurality of data, storing in at least one memory device the multiple sources and the at least one spatial anchor and temporal anchor, receiving, through a user interface of a viewing device, query relating to a real-world environment and displaying the 3D arrangement of the plurality of data in the viewing area of the viewing display in spatial relationship with the real-world environment as viewed in the viewing area. A computerized method and system are also disclosed.

21 Claims, 6 Drawing Sheets

(56) References Cited

U.S. PATENT DOCUMENTS

| | | | |
|---|---|---|---|
| 10,665,037 B1 | 5/2020 | Brimhall et al. | |
| 2004/0088698 A1* | 5/2004 | Claiborne | G06F 8/61 717/174 |
| 2008/0266323 A1* | 10/2008 | Biocca | G06F 3/0426 345/633 |
| 2010/0208033 A1* | 8/2010 | Edge | H04N 13/221 348/46 |
| 2012/0069131 A1* | 3/2012 | Abelow | G06Q 10/067 348/14.01 |
| 2012/0081529 A1 | 4/2012 | Seo | |
| 2013/0076788 A1* | 3/2013 | Ben Zvi | G06F 16/951 345/633 |
| 2013/0083018 A1 | 4/2013 | Geisner et al. | |
| 2014/0063055 A1* | 3/2014 | Osterhout | G06F 3/165 345/633 |
| 2014/0129342 A1* | 5/2014 | Sanghavi | G06Q 30/0277 705/14.66 |
| 2014/0210855 A1* | 7/2014 | Cohen | G06F 16/44 345/633 |
| 2015/0237473 A1* | 8/2015 | Koepke | H04W 4/021 455/456.3 |
| 2015/0302639 A1 | 10/2015 | Malekian et al. | |
| 2018/0130259 A1 | 5/2018 | Leefsma et al. | |
| 2018/0293771 A1 | 10/2018 | Piemonte et al. | |
| 2019/0073832 A1 | 3/2019 | Kim | |
| 2019/0311544 A1 | 10/2019 | Kayo et al. | |

OTHER PUBLICATIONS

Echner, M. and Tripp, M. "ARML—An Augmented Reality Standard," Ginzkeyplatz 11 (2010): 5020. http://www.perey.com/MobileARSummit/Mobilizy-ARML.pdf.

Lechner, Martin. "ARML 2.0 In the Context of Existing AR Data Formats," 2013 6th Workshop on Software Engineering and Architectures for Realtime Interactive Systems (SEARIS). IEEE, 2013. https://sci-hub.tw/10.1109/SEARIS.2013.6798107.

Ledermann, F. and Schmalstieg, D. April: A High-Level Framework for Creating Augmented Reality Presentations. IEEE, 2005. https://www.researchgate.net/profile/Florian_Ledermann/publication/4165368_APRIL_A_high-level_framework_for_creating_augmented_reality_presentations/links/569f521e08aee4d26ad12349.pdf.

Ritsos, P.D., Ritsos, D.P. and Gougoulis, A. S. "Standards for Augmented Reality: A User Experience Perspective," International AR standards meeting. vol. 17. 2011. https://www.researchgate.net/profile/Markos_Konstantakis/post/Does_AR_and_MR_improve_User_Experience/attachment/5a70f8bf4cde266d58878b51/AS:588635929862145@1517353150999/download/Standards+for+Augmented+Reality+a+User+Experience+perspective.pdf.

\* cited by examiner

510 — COMBINING A PLURALITY OF DIFFERENT DATA FILES INTO A SINGULAR DATA FILE HAVING A BINARY DATA FORMAT WITH A FIRST COMPUTING DEVICE WHEREIN COMBINING PROVIDES FOR A SERIALIZE ARRANGEMENT RESULTING IN EACH DIFFERENT DATA FILE TO FUNCTION INDEPENDENT OF ANOTHER DATA FILE

520 — PROVIDING AT LEAST ONE OF A SPATIAL ANCHOR AND A TEMPORAL ANCHOR ASSOCIATED WITH CONTENT OF EACH DIFFERENT DATA FILE OF THE PLURALITY AS PART OF THE SINGULAR DATA FILE TO PROVIDE FOR MULTI-MODAL CONTENT AND RESPECTIVE TIME SEQUENCE AND SPATIALLY LOCALIZED COORDINATE INFORMATION THAT FORMS A TRAINING MODULE;

530 — STORING THE SINGULAR DATA FILE THAT FORMS THE TRAINING MODULE AT A REMOTE STORAGE DEVICE;

540 — RECEIVING, THROUGH A USER INTERFACE OF A VIEWING DEVICE, QUERY RELATING TO A REAL-WORLD ENVIROMENT

550 — DISPLAYING THE SINGULAR DATA FILE IN A THREE-DIMENSIONAL ARRANGEMENT A VIEWING AREA OF THE VIEWING DISPLAY IN SPATIAL RELATIONSHIP WITH THE REAL-WORLD ENVIRONMENT AS VIEWED IN THE VIEWING AREA

SYSTEM AND METHOD FOR AUTOMATED TRANSFORMATION OF MULTIMEDIA CONTENT INTO A UNITARY AUGMENTED REALITY MODULE

CROSS-REFERENCE TO RELATED APPLICATIONS

This application claims the benefit of U.S. Provisional Application No. 63/007,992 filed Apr. 10, 2020, the entirety of which is incorporated by reference.

BACKGROUND

Embodiments relate to augmented reality and, more specifically, to a system and method providing a single standardized format that transforms files into a single data file type that retains all information and functionality that relates each file and is created as a file type.

Augmented reality ("AR") is an interactive experience of a real-world environment where objects that reside in the real-world are enhanced by computer-generated perceptual information, sometimes across multiple sensory modalities, including visual, auditory, haptic, somatosensory and olfactory.

AR is possible because of software that allows for components of a digital world to blend into a person's perception of the real-world, not as a simple display of data, but through an integration of immersive sensations, which are perceived as natural parts of an environment. Augmented reality has been explored for many applications, from gaming and entertainment to medicine, education and business. Example application areas include archaeology, architecture, commerce and education. For example, earliest examples include augmented reality used to support surgery by providing virtual overlays to guide medical practitioners, to AR content for astronomy and welding.

Content created within or for an augmented reality application such as, but not limited to, for training, or an operational job aid are individually created and manually assembled and edited using third party software and then spatially located using an augmented reality platform. This requires a custom solution to be software coded every time. A person creating training AR application creates a video and saves it during the development process. For example, the developer adds a photo and saves the content. The developer may next add text instructions and save the content. These items are individual pieces of data. They are not related spatially or on a timeline. To relate them spatially or on a timeline, a user, or developer, must manually edit, including similarly editing video. This editing requires specialized software and editing skills, which are inefficient and costly.

The inventors have determined that several software programs, such as those provided by PTC Inc., have attempted to create zip file extensions to address compression and security issues. This allows transfer of information but does not transform the data itself into a different product. The information that was zipped retains the same properties when unzipped. Another program, Unity, uses asset bundles that compress metadata into a folder and helps address file size and processing at run time. Other entities, such as Apple® and Adobe®, have created unique file types to support augmented reality which addresses standardization of file type, but no transformation of content takes place. Thus, in general, the inventors have found that previous, or prior art, solutions address the ability to transfer files of large sizes using compression techniques and also addressed file security. These solutions also address standardization of file types. These solutions did not address combining individual meta data that are typically included in augmented reality training or job aids into a single file type that would automatically produce a single continuous training module or work unit.

Developers and users of augmented reality would benefit from developmental software that transforms files into a single data file type that retains all information that relates each multimedia file and is created as a file type, results in automatic creation of an augmented reality module such as, but not limited to, a training module or job aid because this automatic transformation reduces the time and cost of creating augmented reality content.

SUMMARY

Embodiments relate to a system, a computer implemented method and a computerized method for providing a standardized format that transforms files into a unified data file type that retains all information and functionality that relates each file into a single file type use for at least one of augmented reality, virtual reality and mixed reality. The system comprises at least one computing device, a data storage device and a display device configured to display a real-world environment and at least one of a virtual reality environment, an augmented reality environment and a mixed reality environment. The at least one computing device has at least one processor to execute instructions stored on non-transitory, tangible computer-readable storage medium to cause the at least one computing system to perform first instructions which, when executed by the at least one processor, causes the at least one processor to combine a plurality of data files having a plurality of data formats into a unified format that provides for each data format to run independently and with at least one of a spatial anchor and a temporal anchor to provide for a three-dimensional ("3D") arrangement of the plurality of data. The at least one computing system also performs second instructions which, when executed by the at least one processor, causes the at least one processor to provide a user interface displayed to a user on the display device to select the 3D arrangement of the plurality of data files for viewing on the display device in spatial relationship with a real-world environment. The at least one computing system also performs third instructions which, when executed by the at least one processor, causes the at least one processor to display the 3D arrangement of the plurality of data files in the viewing area of the viewing display in at least one of a spatial relationship as defined by the spatial anchor and a temporal relationship as defined by the temporal anchor with the real-world environment as viewed in the viewing area. The storage device stores the 3D arrangement of the plurality of data within a database wherein the database stores mapping between the 3D arrangement of the plurality of data files with the at least one spatial anchor and the temporal anchor.

The computer implemented method comprises producing, with at least one of a computing device, an augmented reality computing device, a virtual reality computing device and a mixed reality computing device, multiple sources of data files provided in individual formats to overlay within a real-world environment. The method further comprises combining the multiple sources of data files into a unified data format that provides for each individual data format of the multiple sources of data files to run independently and with at least one of a spatial anchor and a temporal anchor to provide for a three-dimensional ("3D") arrangement of the plurality of data. The method also comprises storing in at least one memory device the multiple sources and the at least one of the spatial anchor and the temporal anchor. The method further comprises receiving, through a user interface of a viewing device, query relating to a real-world environment. The method also comprises displaying the 3D arrangement of the plurality of data in the viewing area of the viewing display in spatial relationship with the real-world environment as viewed in the viewing area.

The computerized method comprises combining a plurality of different data files into a singular data file having a binary data format with a first computing device wherein combining provides for a serialized arrangement resulting in each different data file to function independent of another data file. The computerized method further comprises providing at least one of a spatial anchor and a temporal anchor associated with content of each different data file of the plurality as part of the singular data file to provide for multi-modal content and respective time sequence and spatially localized coordinate information that forms a training module. The computerized method further comprises storing the singular data file that forms the training module at a remote storage device and receiving, through a user interface of a viewing device, query relating to a real-world environment. The computerized method also comprises displaying the singular data file in a three-dimensional arrangement a viewing area of the viewing display in spatial relationship with the real-world environment as viewed in the viewing area.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Embodiments are described herein with reference to the attached figures wherein like reference numerals are used throughout the figures to designate similar or equivalent elements. The figures are not drawn to scale, and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Embodiments disclosed herein are applicable to any type of AR module. However, as the inventors are developing AR modules specific to AR training modules and operational job aid modules, embodiments disclosed herein may reference either AR training modules or operational job aid, or training, modules.

Figure 1:
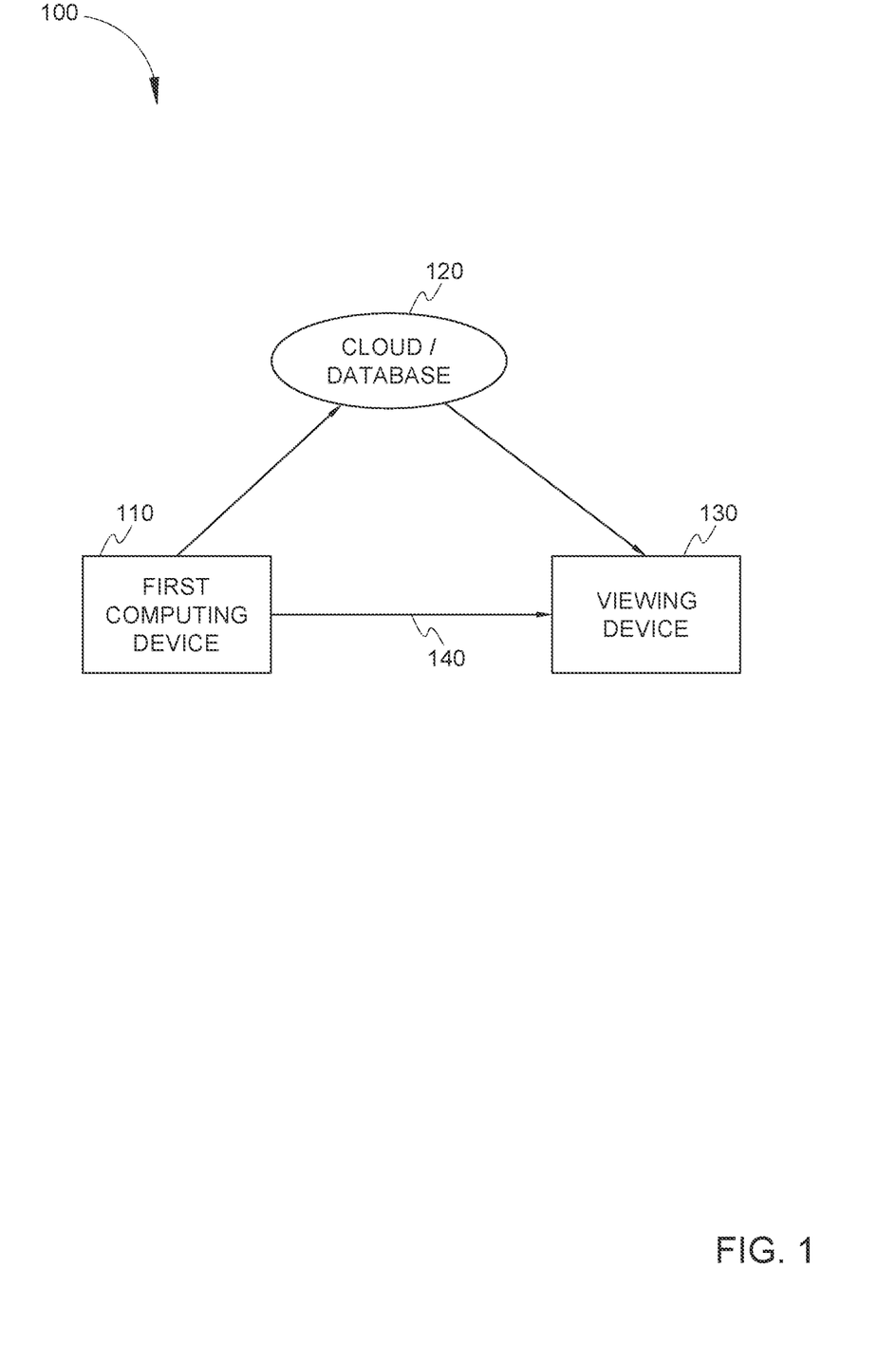
FIG. 1 shows an embodiment of a system automated transformation of multimedia content into a unitary augmented reality module.

FIG. 1 shows an embodiment of a system automated transformation of multimedia content into a unitary augmented reality module. The system 100 has a first computing device 110 provided. The first computing device 110 may be a general computer, smart phone or a wearable device through which AR is viewable. The first computing device 110 may also be an AR, virtual reality ("VR") and/or mixed reality ("MW") capable device. Thus, as used herein, though AR is most frequently used, AR is also provided to cover VR and MR as well, meaning that any use of AR alone also applies to either VR and MR. Non-limiting examples of the wearable device include, but are not limited to, Microsoft® Hololens®, Magic Leap®, etc. Each of these non-limiting examples of the first computing device may have a processor to perform the functionality disclosed herein.

Figure 6:
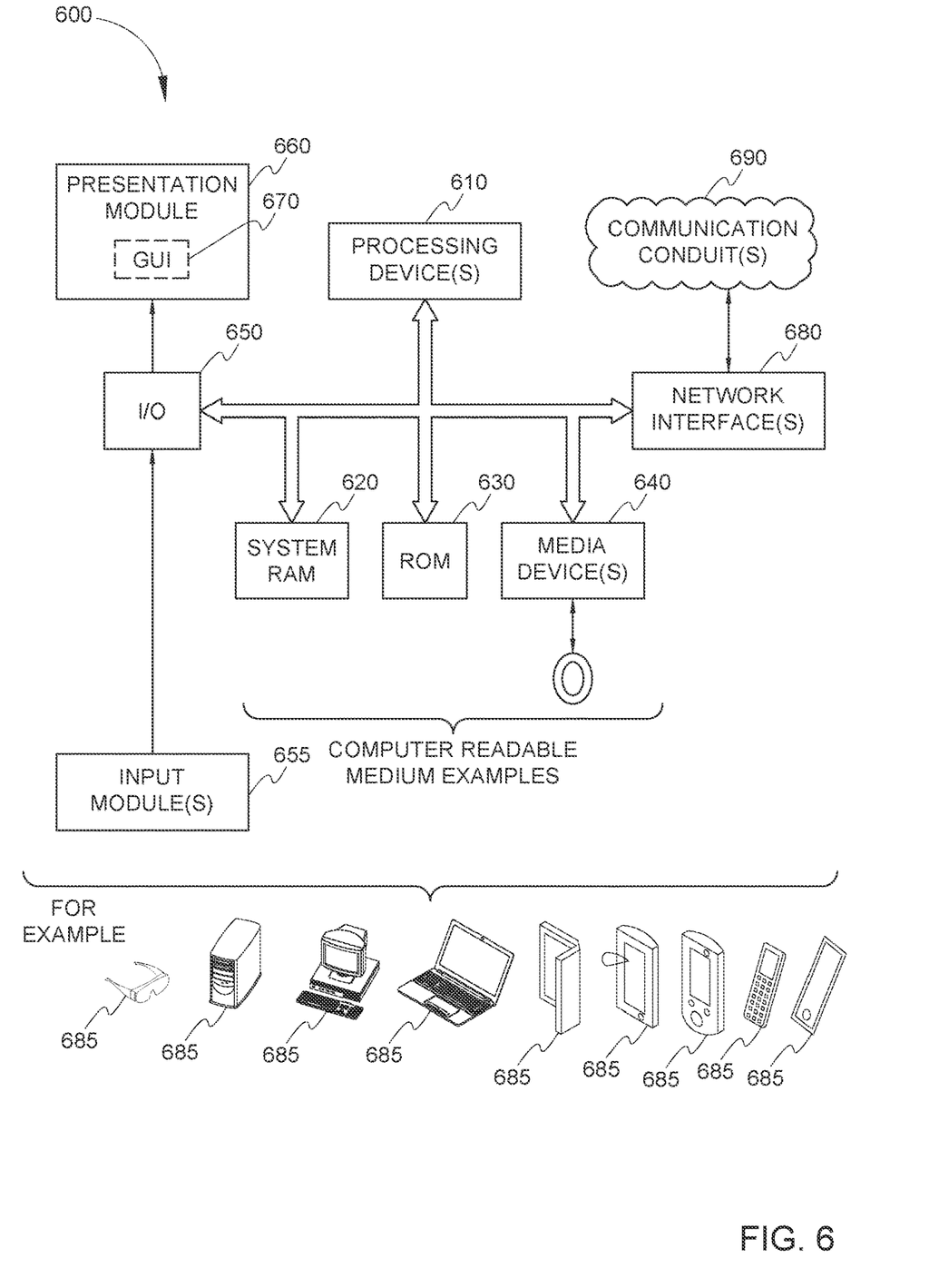
FIG. 6 shows an embodiment of a computing system.

As further explained below, the first computing device 110 may be in communication with a remote storage facility or database 120 such as, but not limited to, one which is considered as cloud computing, which may be considered as an on-demand availability of computer system resources, especially data storage and computing power, without direct active management by a user. A viewing device 130 is available to receive information stored on the cloud database for viewing purposes. The viewing device 130 may also comprise a processor, such as shown in FIG. 6, to obtain the information in the cloud database 120 and process it to be viewable at the viewing device 130. As described and shown herein, the viewing device 130 may also be a second computing device, AR viewing device, VR viewing device, MR viewing device, smartphone, etc.

Though the embodiments herein illustrate a cloud-based database 120 for storing content for later viewing, in another non-limiting embodiment, the cloud-based database 120 is not utilized. Instead, a communication link 140 may be available between the first computing device 110 and the viewable device 130 wherein at least one also has a storage device to store the eventual viewable content. The communication link 140 may be wired or wireless, though a preferred link is a wireless communication protocol or electromagnetic transfer of information such as, but not limited to, Bluetooth, radio, mobile networks, etc.

Figure 2:
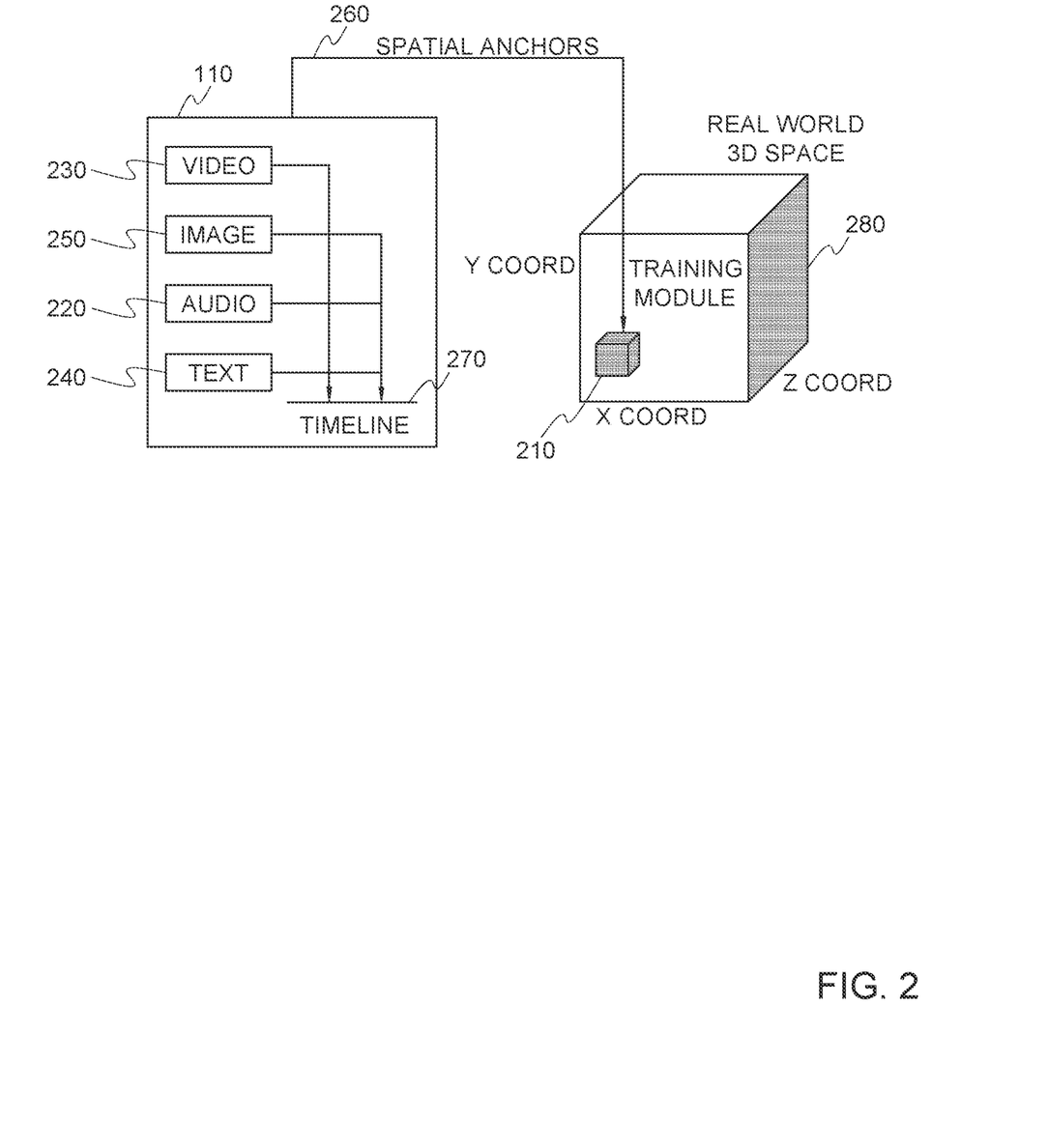
FIG. 2 shows an embodiment of an AR training module.

FIG. 2 shows an embodiment of an AR training module. The AR training module 210 may be constructed by providing content via a web portal, an AR Headset or a handheld AR device. Providing content involves the generation of individual training steps and adding content to each step. This content may be spatialized, or it may be anchored to preset points or positions within a sequence or pre-established content with the training module 210. The content for each step may be text based, or individual files that comprises more than just text. If the AR training module is created in a web portal, spatial information may be supplied by way of a web-based 3D environment editor, or by using an AR Headset or a handheld AR device to provide the specific spatialization information for the steps and the individual files. In general, individual files such as, but not limited to, metadata files, may be provided within a spatialized augmented reality training module. The individual files may originate at the first computing device 110 and may be stored at a database 120 such as, but not limited to, an online or a cloud-based database. The individual files that may be provided include, but are not limited to, audio content 220, video content 230, text content 240, imagery/photo content 250, relative position 260 (spatial anchors unique to augmented reality) and/or time sequence 270 of the information. The spatial anchor 260 may be any one of or a combination of a geolocation or x,y,z coordinate for position, a quaternion w,x,y,z to describe rotation, in addition to any rotation specific behavior that should be applied depending on the users orientation relative to the content (e.g., should always face the user), as well as an x,y,z coordinate to represent the scale in relation to the world space of the environment, along with other modifiers to represent behaviors related to the scale such as maintaining a certain size depending on the user's location and distance from the object. This spatial information may be appended to specific multimedia content such that the content may be presented in a particular location in a physical space, or particular location with reference to a physical object. Though not explicitly shown, other files 255 may include training performance metrics and calculations, sequencing of the content and computer aided design ("CAD") models and model animation data. Non-limiting examples format that may work with embodiments disclosed herein include, but are not limited to, .jpeg and .png image files, .mp4 video files, .mp3 and .wav sound files, .gltf 3D models, and animation content.

The training module 210 may be a stepwise procedure wherein the module is comprised of spatialized named steps within which multimedia content, metrics, calculations and CAD models may be both static and animated. The training module 210 may be a scenario within which a user may interact with spatialized multimedia content in a semi-structured or free form manner or even gamified wherein there is a stated goal that prompts the user to interact with content in a particular manner to achieve a stated goal. The end user may be expected to interact with either all content, or the necessary content to achieve the stated goal or a defined performance metric. A goal of interacting with the content may be any one of the acquisitions of knowledge, a score on an objectively scored test or quiz, scores on a series of objectively scored tests or quizzes that may or may not be aggregated, a time-based metric, simple completion, etc.

Even once formed in the AR training module 210, each individual file may continue to be spatially aware of its surroundings. The file format may be created by authoring content in a three-dimensional ("3D") world space 280, as this methodology supports AR, VR, and MR, which requires unique data, and that data is affected by the kind of content being placed. An authoring capability or providing the content, located at the first computing device 110, may support 2D multimedia, in the form of videos 230, audio 220, images 250 and other forms of 2D media 255. The authoring capability also may support 3D multimedia in the form of 3D models, 3D models with animation and platform specific content. At this point, the eventual viewable content which, as a non-limiting example, is a lesson, exists as a data file containing all information needed to recreate the lesson in AR, VR and/or MR by the viewing device, which may comprise a capability to view the content.

The data file itself may be comprised of a set of key/value pairs representing each piece of information. For conversion to a data format usable as disclosed herein, the data may be packed into a compressed data format utilizing a data packing algorithm at the point of creation on the first computing device. Once in this compressed format, the data may be encrypted such as, but not limited to, with a base64 encoding methodology to prevent unauthorized access. The multimedia content may also be compressed in a separate data folder and packed in a similar manner and then provide or sent as a single folder. Hence, the data file may be created and sent either within the data folder or independent of the data folder. This maintains the integrity of the individual file types and allows them to run independently. The two compressed and encrypted data files may finally be packed into a single data file and encrypted a final time. This new encrypted file will represent the new data format, which has been fully serialized. This has traditionally been accomplished through simple asset bundling serialization which is not spatially aware. Thus, the resulting file may be considered an asset bundle which includes spatial awareness. An asset bundle may be considered an archive file that contains platform-specific non-code assets such as, but not limited to, models, textures, prefabs, audio clips, and even entire scenes that, collectively, can be loaded at run time. Asset bundles can express dependencies between each other. As a non-limiting example, a material in one asset bundle may reference a texture in another asset bundle. For efficient delivery over networks, the asset bundle may be compressed with a choice of built-in algorithms depending on use case requirements. The asset bundle may be useful for downloadable content (DLC), reducing initial install size, loading assets optimized for the end-user's platform, and reduce runtime memory pressure. By including either a spatial anchor or a temporal anchor, the proposed solution adds spatial and temporal awareness to files that would traditionally only be bundled.

Spatial awareness may be based on at least one form of various different forms of environmental sensing techniques, including, but not limited to, offset from a central point which allows the user to place content in a space for viewing/interacting, image/object recognition which allows the user to place content based on recognizing a specific image marker or a specific real-world object where the spatially aware content would be anchored to this real-world point, geo-specific anchoring which utilizes a room scan or GPS based coordinates, so that content is anchored to a physical space, GPS location which utilizes coordinates that define an outdoor or indoor location, and beacons to define an outdoor or indoor location. The type of content is non-limiting. The content is used to form an object. Thus, as non-limiting examples, the object may be a chair placeable within a room, a room placeable within an open space, a circuit board layout placeable over an existing circuit board, etc.

Temporal awareness may be based on at least one form of various different forms of temporal sensing techniques, including, but not limited to, tracking the user's position over time using the internal device clock correlated with the user's current spatial coordinates, as well as any inputs and interactions executed by the user. These inputs may be captured and categorized individually or aggregated into interactions and correlated using at least one internal-clock generated time stamp and environmentally sensed spatial content. The temporal content may be used to guide and or (at least one of) sequence performance and interaction with multimedia content and output data that can be used as part of a performance evaluation.

Each individual file may be specified by when the content should appear (timestamp), where the content should appear (localization), transition in and out information to create a cohesive directed user experience with the content. This content may be placed in a timeline file that will specify the specific timing information. This timeline file may be part of the overall content in a singular format, or AR training module. This timeline capability may be specifically enhanced for augmented reality training in a spatially aware context.

The files may be transformed into singular binary data format, generated at the first computing device and stored in the cloud-based database. The transformation may be accomplished through serialization and the resulting format may compress the content for security purposes and ensure that each file retains its individual properties. The proposed format may include geo-tagged information that may be categorized by a variety of categories such as, but not limited to, a trainee level when embodiments are used for training, and may compress the content and encrypt it for security purposes. The compression may use standard algorithms and the encryption may use industry standard encryption modules. Embodiments herein may compress the information along with at least one of temporal data and spatial data such that each type of data relates to a least temporal awareness or spatial awareness and to the overall resultant AR training module. When both temporal data and spatial data are used, each type of data may relate to the other. The result may be provided in a file format that encapsulates multi-modal content and respective time sequence and spatially localized coordinate information that forms the training module whereas a typical approach would only result in the decompression of individual data files. This transformation will ensure that each individual file retains its unique properties as well as information that relates each piece of data to another and to the overall resultant AR training module. The result may be provided in a file format that encapsulates multi-modal content and respective time sequence and spatially localized coordinate information that forms the training module.

To ensure the validity of the underlying data, an encrypted validation component will be added to ensure origin and security of the file. The validation and encrypted serialized data will be combined into a single file.

When operationally in use, the module may be opened as a single AR training file compatible with a spatial computing system. Non-limiting examples of the spatial computing system may include, but are not limited to, head mounted displays, wearable goggles/glasses or mobile devices. Unlike other AR systems that will open each metadata as a separate piece of information, the embodiments disclosed herein allow for the data to be presented as a single, coherent data package that has at least one of specific temporal coordinates, or data, and spatial coordinates, or data, that can live in a three-dimensional space. A prior art approach would be void of these two elements. As disclosed herein, the data package may be created by packing the individual files, along with the metadata, into a binary file that contains all the information necessary to recreate the individual files with information such as geotagging, trainee level, and contextual information to use of the content. The end user will experience the content as a single instructional file or training module that incorporates each original multimedia file which is consumed along a time and at a spatial coordinate relevant to the training task. The module may automatically determine when and where the multimedia content should be consumed.

Embodiments may provide for a new file type to be created having at least one of a temporal component and a spatial component. The new file type may include extra, or unique, code that automatically determines the time and location when and where the multimedia information should be accessed. When the content is created, the metadata may contain markers for both geo-tagged information so it may be loadable/viewable only within a certain radius from the specific location. This utilizes the run-time device location to determine which content may be portrayed within the viewing space.

Figure 3:
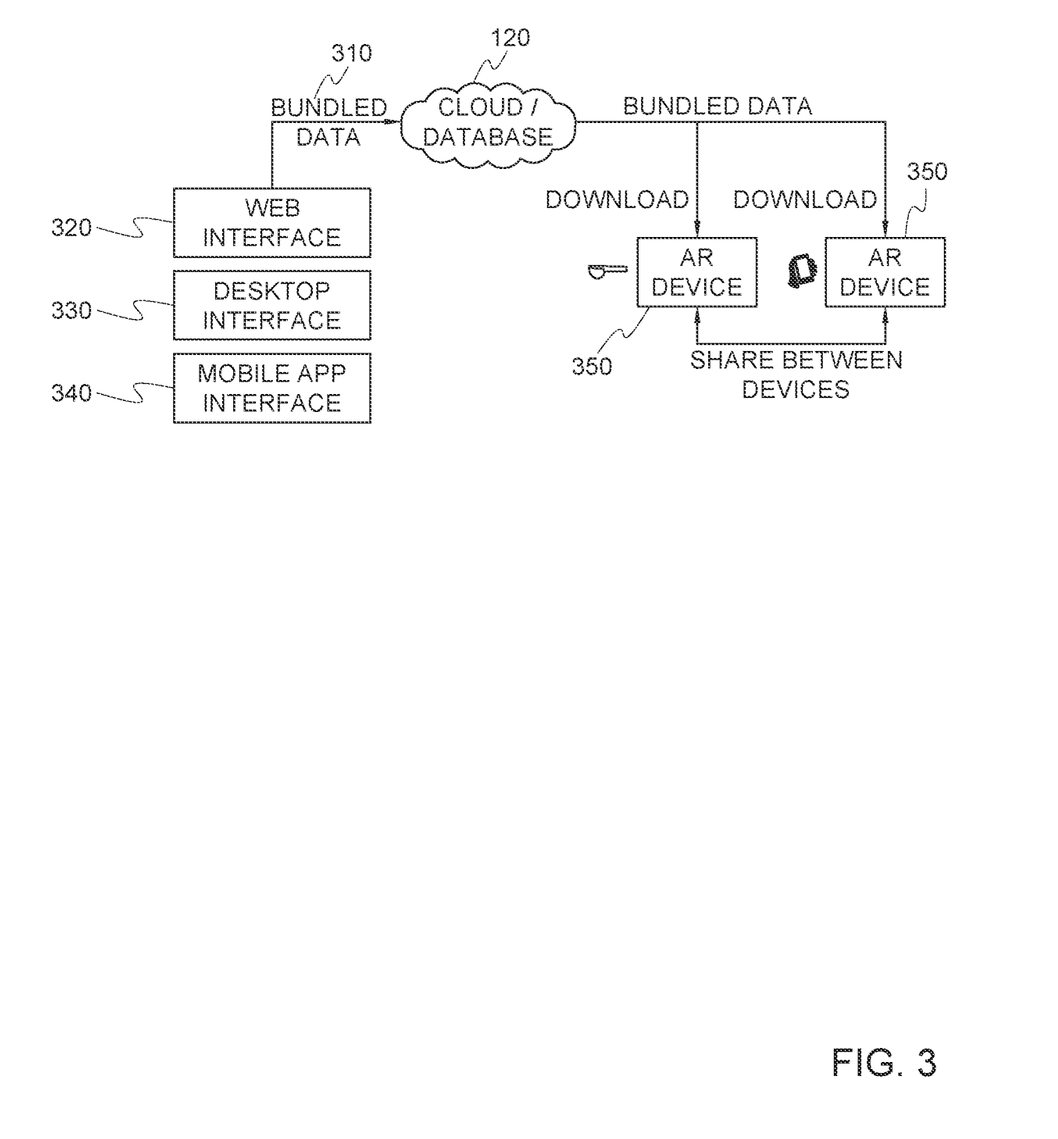
FIG. 3 shows an embodiment of a flow of bundled data as disclosed herein.

FIG. 3 shows an embodiment of a flow of bundled data as disclosed herein. The bundled data 310 may be bundled as serialized data which may be the AR training module 210. In another embodiment, the data 310 may be the individual files 220, 230, 240, 250, 255 before being placed in the AR training module 210. As shown in FIG. 3, the bundled data 310 may be gathered or produced from at least one of a web based software program which has an interface 320 to a computer network such as, but not limited to, the Internet, a desktop program which has an interface 330 to the cloud storage device 120 and/or a mobile application which has an interface 340 to the cloud computing or storage network 120. Though not shown, a head mounted display/glasses application with an interface may be provided where the head mounted app interface connects to the cloud computing or storage network 120. Thus, the data 310 may be stored remote from the producing programs such as, but not limited to, at the cloud storage 120. During transmission to the cloud storage 120, the individual files 220, 230, 240, 250, 255 may be combined into the AR training module 210. The individual files 220, 230, 240, 250, 255 may be appended to a named training module. The training module 210 may be then bundled into a singular digital file containing all associated data upon transmission to the cloud storage 120. The transmission to the cloud storage 120 may be initiated from the desktop computer system, the internet-based website or computing system, the mobile application or the augmented reality head mounted display or glasses where in each situation the respective interface 320, 330, 340 connects to the cloud storage 120. For the AR headset and handheld AR devices, the bundling process may involve conversion of the individual training data, e.g., the steps and the references to any individual files that are displayed on that training step, into a data file that contains the training data, the spatial data for the training data, and references to the individual file, as they are packaged separately, and ordered so the training data may be stored with the appropriate sequence information to display content in a specific order. Once this data file is generated, the individual files may be converted to a serialize data array. Each individual file serialized data array may be put into a separate data file that contains both the metadata about the serialized content along with the actual serialized content. Depending on the size and quantity, multiple data files may be generated. The training data file and the serialized data files may then be compressed and encrypted into a single data file. This new data file represents the bundled AR training data. On desktop computers or web platforms, the bundling follows a similar process, however if spatial data is not included, the content may either require additional authoring on a spatialized platform or may rely on predetermined real-world anchoring to place content. The data may be downloaded to AR devices 350, including tablets, ruggedized tablets, smartphones, ruggedized smartphones, head mounted displays and glasses, which may also share the data between these AR devices 350.

The downloading process may follow the inverse of the bundling process. The data may be first decrypted and decompressed. This provides the receiving system the AR training data along with all the individual files, in serialized form. This data may be used to reconstruct the AR training by using the data contained therein to place the individual training content and all associated files.

Figure 4:
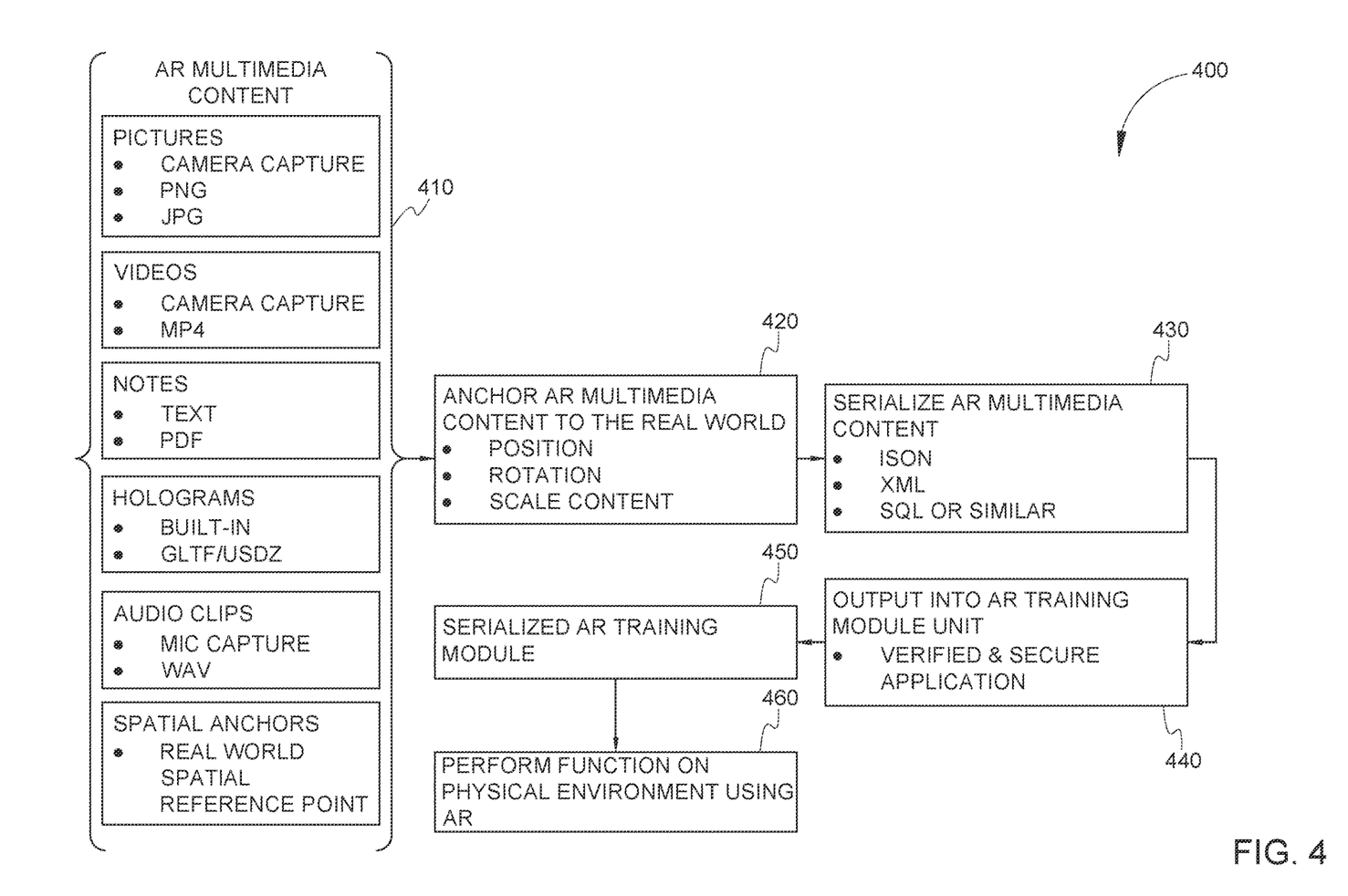
FIG. 4 shows a flowchart of an embodiment of a process for creating an AR training module.

FIG. 4 shows a flowchart of an embodiment of a process for creating an AR training module. The method 400 comprises gathering AR multimedia content at 410. The multimedia content may include electronic/digital text, graphics or digital images, videos or 3D CAD models. The multimedia content may be gathered by uploading existing content from a laptop or desktop computing system to a centralized website or desktop software package where the multimedia may be appended or added to a training module and stored in the cloud. The multimedia content may also be gathered by mobile devices such as smartphones, digital cameras or video recorders, 360-degree photo or video devices, 3D scanning technology and augmented reality enable digital devices such as, but not limited to, head mounted displays or glasses. The multimedia gathered from each device may be saved to a cloud (remote) computing system and accessed by a desktop, laptop or mobile computing systems and appended to a training module. The multimedia may also be directly appended to the training module using an end user device such as a smartphone or augmented reality headset or glasses. The method next comprises anchoring the AR multimedia content to physical locations in the real-world using an augmented reality headset, smartphone or at a laptop/desktop or mobile computing system, at 420. These devices may perform a scan of the physical environment (e.g., room, facility, object) and allow the user to digitally place the multimedia content in a specific location. The software system may geolocate the multimedia such that the x, y, z coordinate within the physical space or on the object may be appended to the training module and saved. The result may be considered a spatialized augmented reality multimedia data. The method also comprises serializing the AR multimedia data to create an AR training module, at 430.

The spatialized augmented reality multimedia data may be serialized and bundled into a singular digital package. The method also comprises outputting to the AR training module, at 440. The singular digital package may be outputted and stored remotely, such as by using cloud computing. The method also comprises downloading the digital package and unbundling it onto an end user augmented reality headset or mobile device such as a head mounted display, smartphone, tablet, ruggedized tablet or computing system or glasses as the serialized AR training module, at 450. The method also comprises utilizing the AR training module to perform a function utilizing an AR device, at 460. Once downloaded on the end user device, the device may initiate a scan of the physical environment then inserts the digital, spatialized multimedia content into the physical environment. For example, a video, picture, 3D CAD model or note/text may be virtually located in the physical environment and viewed through the end user device.

Embodiments disclosed herein may include real-world positioning data such as, but not limited to, spatial positioning in a room or on a piece of equipment or asset such as an aircraft, an engine or parts of a moving assembly line. Thus, files, the content, the metadata, and the context are combined into a single, unique file that may be compressed and encrypted to ensure secure transmission and storage. Embodiments present information at least one of temporally and spatially in 3D space with all data files combining to create a singular training module that can respond to human actor interaction based on when and where a user acted in a three-dimensional grid system.

Figure 5:
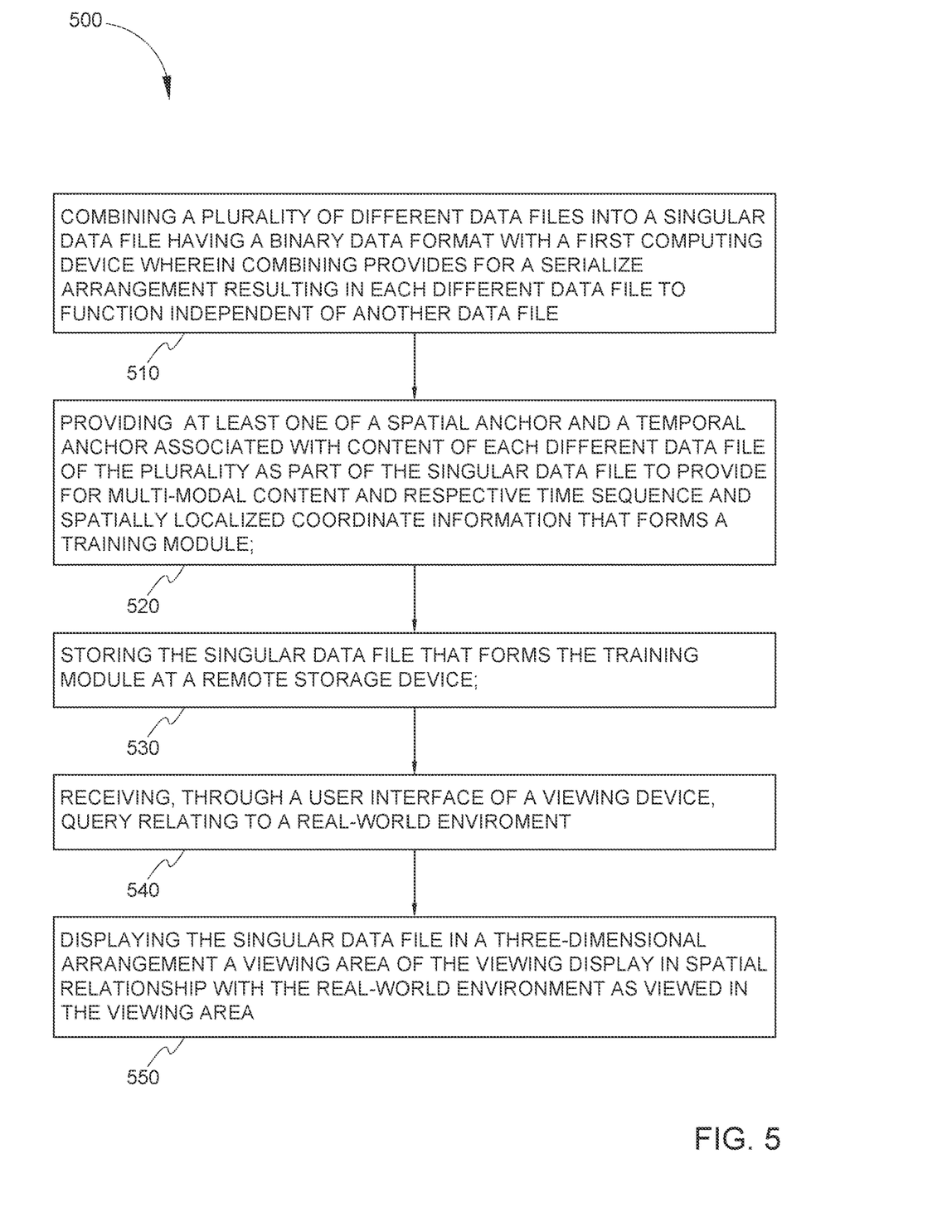
FIG. 5 shows a basic configuration of a computing device that may include any type of stationary computing device or a mobile computing device.

FIG. 5 shows a flowchart of an embodiment of a computerized method. The method 500 comprises combining a plurality of different data files into a singular data file having a binary data format with a first computing device wherein combining provides for a serialize arrangement resulting in each different data file to function independent of another data file, at 510. The method also comprises providing at least one of a spatial anchor and a temporal anchor associated with content of each different data file of the plurality as part of the singular data file to provide for multi-modal content and respective time sequence and spatially localized coordinate information that forms a training module, at 520. The method further comprises storing the singular data file that forms the training module at a remote storage device, at 530. The method further includes receiving, through a user interface of a viewing device, query relating to a real-world environment, at 540. The method further provides for displaying the singular data file in a three-dimensional arrangement a viewing area of the viewing display in spatial relationship with the real-world environment as viewed in the viewing area, at 550.

Referring now to FIG. 6, in a basic configuration, a computing device, or system, may include any type of stationary computing device or a mobile computing device. The computing device 600 may include one or more processors 610 and system memory in a hard drive. Depending on the exact configuration and type of computing device, system memory may be volatile (such as RAM) 620, non-volatile (such as read only memory (ROM) 630, flash memory, and the like) or some combination of the two. A system memory 620, 630 may store an operating system, one or more applications, and may include program data for performing flight, navigation, avionics, power managements operations such as for space operations.

The computing device 600 may carry out one or more blocks of a process described herein. The computing device 600 may also have additional features or functionality. As a non-limiting example, the computing device 600 may also include additional data storage devices (removable and/or non-removable) 640 such as, for example, magnetic disks, optical disks, or tape. The computer storage media 640 may include volatile and non-volatile, non-transitory, removable and non-removable media implemented in any method or technology for storage of data, such as computer readable instructions, data structures, program modules or other data. The system memory 620, 630, removable storage and non-removable storage 640 are all non-limiting examples of computer storage media. The computer storage media may include, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

The computing device may also include or have interfaces 650 for input device(s) (not shown) such as a keyboard, mouse, pen, voice input device, touch input device, etc. The computing device 600 may include or have interfaces 655 for connection to output device(s) such as a display, speakers, etc. The computing device 600 may include a peripheral bus for connecting to peripherals. Computing device may contain communication connection(s) 690 that allow the device to communicate with other computing devices 685, such as over a network or a wireless network, such as, but not limited to augmented reality devices, virtual reality devices, etc. By way of example, and not limitation, communication connection(s) 690 may include wired media such as a wired network or direct-wired connection, and wireless media such as acoustic, radio frequency (RF), infrared and other wireless media. The computing device may include a network interface card 680 to connect (wired or wireless) to a network. The computing device 600 may also provide for a presentation module 660, which also may have a graphical user interface (GUI) 670. The presentation module 660 and GUI 670 may provide information to the computing device 685, as discussed above, through which the presentation module 660 and/or GUI 670 is accessible or viewable via the computing device 685.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general-purpose computer, but rather the special purpose computer programmed to perform the disclosed algorithm.

A general-purpose computer, or microprocessor, may be programmed to carry out the algorithm/steps for creating a new machine. The general-purpose computer becomes a special purpose computer once it is programmed to perform particular functions pursuant to instructions from program software of the embodiments described herein. The instructions of the software program that carry out the algorithm/steps electrically change the general-purpose computer by creating electrical paths within the device. These electrical paths create a special purpose machine for carrying out the particular algorithm/steps.

Thus, embodiments disclosed herein provide for a process that creates a single, useful module that relates content spatially and on a timeline so that it is portable, and can be consumed at runtime by an augmented reality application. The client software can extract these components and presents them in a reassembled format that includes geo-specific or context-specific information at run-time. For example, using the authoring platform located at a first computing device, the user composes the multimedia content along the timeline, and with geo-coordinates, so that when a user, such as, but not limited to, a trainee is in a medical training facility, they would load an Augmented Reality training application that displays lessons that are appropriate for their location and competence level in the proper sequence. As the trainer approaches a casualty, the casualty will be displayed in the actual environment and the multi-media content will be decrypted, decompressed, and located to fit the spatial bounds of the real-world environment.

Thus, as disclosed above, a system may comprise a computing device to process a plurality of data having a plurality of data formats into a unified format that provides for each data format to run independently and with a least one of a spatial anchor and a temporal anchor to provide for a three-dimensional ("3D") arrangement of the plurality of data. The system may further comprise a remote database to store the plurality of data in the 3D arrangement. The system may also comprise a viewing device configured to retrieve the plurality of data in the 3D arrangement and display the data in at least one of a virtual reality, augmented reality and mixed reality environment wherein the at least spatial anchor and temporal anchor locates visual content of the plurality of data in the 3D arrangement in a spatial position within a real-world environment.

Another embodiment of a system may comprise a computing device, a storage device and viewing device. The computing device includes a processor. The computing device may further comprise first instructions which, when executed by the processor, the processor is configured to combine a plurality of data having a plurality of data formats into a unified format that provides for each data format to run independently and with at least one of a spatial anchor and a temporal anchor to provide for a three-dimensional ("3D") arrangement of the plurality of data. A memory device is provided, possibly remotely from the processor, for storing the 3D arrangement of the plurality of data within a database wherein the database stores mapping between the 3D arrangement of the plurality of data with the at least one spatial anchor and the temporal anchor. Second instructions may also be provided which when executed by the processor, the processor is configured to provide a user interface displayed to a user on the display device to select the 3D arrangement of the plurality of data for viewing on the display device in spatial relationship with a real-world environment. Third instructions may also be provided which when executed by the processor, the processor may be further configured to display the 3D arrangement of the plurality of data in the viewing area of the viewing display in spatial relationship with the real-world environment as viewed in the viewing area.

As disclosed above, embodiment of the computer implemented method may comprise producing, with at least one of an augment reality, virtual reality and mixed reality computing device, multiple sources of environmental data provided in individual formats to overlay within a real-world environment. The method may further comprise combining the multiple sources of environmental data into unified data format that provides for each individual data format to run independently and with at least one of a spatial anchor and a temporal anchor to provide for a three-dimensional ("3D") arrangement of the plurality of data. The method may also comprise storing in memory devices the multiple sources and the at least one of the spatial anchor and the temporal anchor. The method may further comprises receiving, through a user interface of a viewing device, query relating to a real-world environment. The method also may comprise displaying the 3D arrangement of the plurality of data in the viewing area of the viewing display in spatial relationship with the real-world environment as viewed in the viewing area.

In another embodiment, as disclosed above, a non-transitory, tangible computer-readable storage medium having instructions stored thereon that, if executed by a computing system with one or more processors, cause the computing system to perform operations disclosed above with respect to the computer implemented method discussed above.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A system, the system comprising:
   at least one computing device;
   a data storage device;
   a display device configured to display a real-world environment and at least one of a virtual reality environment, an augmented reality environment and a mixed reality environment;
   wherein the at least one computing device has at least one processor to execute instructions stored on non-transitory, tangible computer-readable storage medium to cause the at least one computing system to perform:
      first instructions which, when executed by the at least one processor, causes the at least one processor to combine a plurality of data files having a plurality of data formats into a unified format that provides for each data format to run independently and with at least one of a spatial anchor and a temporal anchor to provide for a three-dimensional ("3D") arrangement of the plurality of data;
      second instructions which, when executed by the at least one processor, causes the at least one processor to provide a user interface displayed to a user on the display device to select the 3D arrangement of the plurality of data files for viewing on the display device in spatial relationship with a real-world environment; and third instructions which, when executed by the at least one processor, causes the at least one processor to display the 3D arrangement of the plurality of data files in the viewing area of the viewing display in at least one of a spatial relationship as defined by the spatial anchor and a temporal relationship as defined by the temporal anchor with the real-world environment as viewed in the viewing area; and wherein the storage device stores the 3D arrangement of the plurality of data within a database wherein the database stores mapping between the 3D arrangement of the plurality of data files with the at least one spatial anchor and the temporal anchor, and wherein each individual data file independently maintains spatial awareness within the real-world environment independent of any other data file.

2. The system according to claim 1, wherein the user interface displayed to the user on the display device is used to select the 3D arrangement of the plurality of data files for viewing on the display device in spatial relationship with a real-world environment is performed at least one of before the plurality of data files are combined and after the plurality of data files are combined with at least one of the spatial anchor and the temporal anchor.

3. The system according to claim 1, wherein the unified format that provides for each data format to run independently is a serialized format.

4. The system according to claim 1, wherein the spatial anchor comprises at least one of a geolocation, a three-dimensional coordinate location for position, a quaternion coordinate location for rotation, a rotation specific behavior appliable based on orientation relative to a content of the data, a three-dimensional coordinate to represent a scale of an imaged object based on the data in relation to a real-world space of the environment and at least modifier to represent behaviors related to the scale of the image dependent on location and distance of the imaged object within the real-world space of the environment.

5. The system according to claim 1, wherein the plurality of data file comprises at least one of two-dimensional ("2D") multimedia data having a form of at least one of a video file, an audio file, an images file 3D multimedia data having a form of at least one of a 3D model file having at least one of animation specific content and platform specific content.

6. The system according to claim 1, wherein the plurality of data file comprises a compressed data format.

7. The system according to claim 1, wherein the plurality of data file comprises a first file and a second file having multimedia content wherein the first file and the second file are compressed separately to allow for the first file and second file to each function independently.

8. The system according to claim 7, wherein the first file and the second file are packaged into a single data file that is encrypted.

9. The system according to claim 1, wherein the spatial anchor is established with at least one of an environmental sensing technique.

10. A computer implemented method, the method comprising:

producing, with at least one of a computing device, an augmented reality computing device, a virtual reality computing device and a mixed reality computing device, multiple sources of data files provided in individual formats to overlay within a real-world environment;

combining the multiple sources of data files into a unified data format that provides for each individual data format of the multiple sources of data files to run independently and with at least one of a spatial anchor and a temporal anchor to provide for a three-dimensional ("3D") arrangement of the plurality of data;

storing in at least one memory device the multiple sources and the at least one of the spatial anchor and the temporal anchor;

receiving, through a user interface of a viewing device, query relating to a real-world environment;

displaying the 3D arrangement of the plurality of data in the viewing area of the viewing display in spatial relationship with the real-world environment as viewed in the viewing area; and compressing the unified data format into a compressed data file wherein each individual data format runs independently.

11. A non-transitory, tangible computer-readable storage medium having instructions stored thereon that, if executed by one or more computing systems with one or more processors, cause the computerized method to perform operations disclosed above with respect to claim 10.

12. The method according to claim 10, wherein combining the multiple sources of data files into a unified data format further comprises combining the multiple sources in a serialized format to provide for each data format to run independently.

13. The method according to claim 10, further comprising maintaining spatial awareness of each data file within the real-world environment independent of any other data file.

14. The method according to claim 10, further comprising encrypting the unified data format into an encrypted data file.

15. A computerized method comprising:

combining a plurality of different data files into a singular data file having a binary data format with a first computing device wherein combining provides for a serialized arrangement resulting in each different data file to function independent of another data file;

providing at least one of a spatial anchor and a temporal anchor associated with content of each different data file of the plurality as part of the singular data file to provide for multi-modal content and respective time sequence and spatially localized coordinate information that forms a training module;

storing the singular data file that forms the training module at a remote storage device;

receiving, through a user interface of a viewing device, query relating to a real-world environment; and displaying the singular data file in a three-dimensional arrangement a viewing area of the viewing display in spatial relationship with the real-world environment as viewed in the viewing area.

16. A non-transitory, tangible computer-readable storage medium having instructions stored thereon that, if executed by one or more computing systems with one or more processors, cause the computing method to perform operations disclosed above with respect to claim 15.

17. The computerized method according to claim 15, comprising maintaining spatially localized coordinate information for each data file within the real-world environment independent of any other data file.

18. The computerized method according to claim 15, further comprising compressing the singular data file into a compressed data file wherein each individual data format runs independently and encrypting the singular data file into an encrypted data file.

19. A system, the system comprising:
- at least one computing device;
- a data storage device;
- a display device configured to display a real-world environment and at least one of a virtual reality environment, an augmented reality environment and a mixed reality environment;
- wherein the at least one computing device has at least one processor to execute instructions stored on non-transitory, tangible computer-readable storage medium to cause the at least one computing system to perform:
  - first instructions which, when executed by the at least one processor, causes the at least one processor to combine a plurality of data files having a plurality of data formats into a unified format that provides for each data format to run independently and with at least one of a spatial anchor and a temporal anchor to provide for a three-dimensional ("3D") arrangement of the plurality of data;
  - second instructions which, when executed by the at least one processor, causes the at least one processor to provide a user interface displayed to a user on the display device to select the 3D arrangement of the plurality of data files for viewing on the display device in spatial relationship with a real-world environment; and
  - third instructions which, when executed by the at least one processor, causes the at least one processor to display the 3D arrangement of the plurality of data files in the viewing area of the viewing display in at least one of a spatial relationship as defined by the spatial anchor and a temporal relationship as defined by the temporal anchor with the real-world environment as viewed in the viewing area; and
- wherein the storage device stores the 3D arrangement of the plurality of data within a database wherein the database stores mapping between the 3D arrangement of the plurality of data files with the at least one spatial anchor and the temporal anchor, and
- wherein the unified format that provides for each data format to run independently is a serialized format.

20. A computer implemented method, the method comprising:
- producing, with at least one of a computing device, an augmented reality computing device, a virtual reality computing device and a mixed reality computing device, multiple sources of data files provided in individual formats to overlay within a real-world environment;
- combining the multiple sources of data files into a unified data format that provides for each individual data format of the multiple sources of data files to run independently and with at least one of a spatial anchor and a temporal anchor to provide for a three-dimensional ("3D") arrangement of the plurality of data;
- storing in at least one memory device the multiple sources and the at least one of the spatial anchor and the temporal anchor;
- receiving, through a user interface of a viewing device, query relating to a real-world environment;
- displaying the 3D arrangement of the plurality of data in the viewing area of the viewing display in spatial relationship with the real-world environment as viewed in the viewing area,
- wherein combining the multiple sources of data files into a unified data format further comprises combining the multiple sources in a serialized format to provide for each data format to run independently.

21. A computer implemented method, the method comprising:
- producing, with at least one of a computing device, an augmented reality computing device, a virtual reality computing device and a mixed reality computing device, multiple sources of data files provided in individual formats to overlay within a real-world environment;
- combining the multiple sources of data files into a unified data format that provides for each individual data format of the multiple sources of data files to run independently and with at least one of a spatial anchor and a temporal anchor to provide for a three-dimensional ("3D") arrangement of the plurality of data;
- storing in at least one memory device the multiple sources and the at least one of the spatial anchor and the temporal anchor;
- receiving, through a user interface of a viewing device, query relating to a real-world environment;
- displaying the 3D arrangement of the plurality of data in the viewing area of the viewing display in spatial relationship with the real-world environment as viewed in the viewing area; and
- maintaining spatial awareness of each data file within the real-world environment independent of any other data file.

* * * * *

UNITED STATES PATENT AND TRADEMARK OFFICE
CERTIFICATE OF CORRECTION

| | |
|---|---|
| PATENT NO. | : 11,222,478 B1 |
| APPLICATION NO. | : 17/115274 |
| DATED | : January 11, 2022 |
| INVENTOR(S) | : Martin et al. |

It is certified that error appears in the above-identified patent and that said Letters Patent is hereby corrected as shown below:

In the Specification

Column 1, Line 12, insert:
--STATEMENT REGARDING FEDERALLY SPONSORED RESEARCH OR DEVELOPMENT
This invention was made with Government support under N68335-18-C-0535 awarded by the Department of the Navy. The Government has certain rights in this invention.--

Signed and Sealed this
Fifth Day of July, 2022

Katherine Kelly Vidal
*Director of the United States Patent and Trademark Office*